(12) United States Patent
Huh et al.

(10) Patent No.: US 9,733,398 B2
(45) Date of Patent: Aug. 15, 2017

(54) POLARIZING PLATE AND IMAGE DISPLAY APPARATUS COMPRISING SAME

(71) Applicant: LG CHEM, LTD., Seoul (KR)

(72) Inventors: Eun-Soo Huh, Daejeon (KR);
Kwang-Seung Park, Daejeon (KR);
Mi-Rin Lee, Daejeon (KR);
Sung-Hyun Kim, Daejeon (KR);
Jun-Wuk Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/025,194

(22) PCT Filed: Sep. 29, 2014

(86) PCT No.: PCT/KR2014/009128
§ 371 (c)(1),
(2) Date: Mar. 25, 2016

(87) PCT Pub. No.: WO2015/046997
PCT Pub. Date: Apr. 2, 2015

(65) Prior Publication Data
US 2016/0238742 A1 Aug. 18, 2016

(30) Foreign Application Priority Data

Sep. 30, 2013 (KR) .......... 10-2013-0117005
Sep. 26, 2014 (KR) .......... 10-2014-0129393

(51) Int. Cl.
| | | |
|---|---|---|
| *G02B 1/00* | (2006.01) | |
| *G02B 1/14* | (2015.01) | |
| *G02B 5/30* | (2006.01) | |
| *C09D 4/06* | (2006.01) | |
| *G02B 1/04* | (2006.01) | |

(52) U.S. Cl.
CPC ............. *G02B 1/14* (2015.01); *C09D 4/06* (2013.01); *G02B 5/3033* (2013.01); *G02B 1/04* (2013.01)

(58) Field of Classification Search
CPC .......... G02B 1/00; G02B 1/14; G02B 5/3033;
G02B 1/105; G02B 1/16; G02B 1/18;
G02B 5/30; G02B 5/305; G02B 1/04;
G02B 1/02; C08F 2/44; C08F 283/01;
C08F 283/00; B32B 27/30; C08J 5/18;
G02F 1/1335; C08G 63/692; C08G 18/10; C08G 18/672
USPC ........................................ 359/507
See application file for complete search history.

(56) References Cited

U.S. PATENT DOCUMENTS

| | | | |
|---|---|---|---|
| 6,552,159 B1 | 4/2003 | Shiraiwa et al. | |
| 2006/0134400 A1 | 6/2006 | Takada et al. | |
| 2007/0287009 A1* | 12/2007 | Okude ............... | G02B 5/305 |
| | | | 428/411.1 |
| 2009/0086326 A1 | 4/2009 | Hamamoto et al. | |
| 2010/0002298 A1 | 1/2010 | Sugino et al. | |

FOREIGN PATENT DOCUMENTS

| | | |
|---|---|---|
| EP | 2447766 A1 | 5/2012 |
| JP | 2005-010329 A | 1/2005 |
| JP | 2007041533 A | 2/2007 |
| JP | 2007046031 A | 2/2007 |
| JP | 2008151998 A | 7/2008 |
| JP | 2009037223 A | 2/2009 |
| JP | 4459880 B2 | 2/2010 |
| JP | 2012052000 A | 3/2012 |
| JP | 2012137738 A | 7/2012 |
| JP | 2012-183725 A | 9/2012 |
| JP | 2013037057 A | 2/2013 |
| JP | 2013-127571 A | 6/2013 |
| KR | 10-2012-0006081 A | 1/2012 |
| KR | 10-2012-0015780 A | 2/2012 |

* cited by examiner

*Primary Examiner* — Euncha Cherry
(74) *Attorney, Agent, or Firm* — Dentons US LLP

(57) ABSTRACT

The present invention relates to a polarizing plate including a polarizer; and a protective layer formed on at least one surface of the polarizer, in which the protective layer is a cured product of a radical curable composition having a hydroxy value of 500 mg·KOH/g or more, and an image display device including the same.

20 Claims, No Drawings

POLARIZING PLATE AND IMAGE DISPLAY APPARATUS COMPRISING SAME

This application is a National Stage Application of International Application No. PCT/KR2014/009128, filed on Sep. 29, 2014, which claims the benefit of Korean Patent Application No. 10-2013-0117005, filed on Sep. 30, 2013 and Korean Patent Application No. 10-2014-0129393, filed on Sep. 26, 2014, all of which are hereby incorporated by reference in their entirety for all purposes as if fully set forth herein.

TECHNICAL FIELD

The present invention relates to a polarizing plate and an image display device including the same, and more specifically, to a polarizing plate which has excellent adhesion between a polarizer and a protective layer, is excellent in heat resistance, and may be manufactured in a thin-type, and an image display device including the same.

BACKGROUND ART

A polarizing plate has been usually used in a structure, in which a protective film is stacked on both surfaces of a polarizer formed of a polyvinyl alcohol (hereinafter, referred to as 'PVA')-based resin dyed with a dichroic dye or iodine. This is because there is a problem in that when the protective film does not exist, durability and optical properties of the polarizer significantly deteriorate due to the vulnerable dimensional stability, and water resistance thereof also becomes notably vulnerable. In this case, a triacetyl cellulose (TAC)-based film has been frequently used as the protective film because the film is excellent in optical transparency or moisture permeability.

Meanwhile, as a liquid crystal display device has recently been developed into a mobile device such as a laptop personal computer, a cellular phone and a car navigation system, it is required that a polarizing plate which constitutes a liquid crystal display device is thin and light weight. However, in a polarizing plate in which a TAC film and the like are laminated as the protective film as described above, it is difficult to maintain a thickness of the protective film at 20 μm or less from the viewpoint of handling property or durability performance during the operation, so that there is a limitation for the liquid crystal device to be thin and light weight.

In order to solve the aforementioned problems, a technology has been suggested, in which a transparent thin film layer is formed by forming a protective film on only one surface of a polarizer, and coating an active energy ray curable composition on the other surface thereof. Meanwhile, the active energy ray curable composition which has been suggested may be classified into a radical curable composition and a cation curable composition according to the curing method. In this case, when a transparent thin film layer is formed using a cation curable composition, the transparent thin film layer is advantageous in that excellent adhesion with the polarizer is achieved, but disadvantageous in that a curling problem of a polarizing plate generated from a slow curing rate, a low degree of curing, a dark reaction and the like occur.

In order to solve such problems, a technology has been suggested, in which a transparent thin film layer is formed by using a radical curable composition which includes an acrylic or acrylamide-based compound as a main component, but in this case, there is a problem in that a polarizing plate, which is manufactured by using the composition, does not have good heat resistance because adhesion deteriorates under a high humidity environment, and a transparent thin film layer to be formed has a low glass transition temperature.

Therefore, there is a need for a new polarizing plate, which is excellent in adhesion between a polarizer and a protective layer, maintains adhesion at a good level even under a high humidity environment, and is excellent in heat resistance while having a thin protective layer which may be formed by curing radicals.

DISCLOSURE

Technical Problem

The present invention has been made in an effort to solve the aforementioned problem and provide a polarizing plate, which has excellent adhesion between a polarizer and a protective layer and is excellent in heat resistance even under a high humidity condition, and may be manufactured into a thin-type, and an image display device including the same.

Technical Solution

In one aspect, the present invention provides a polarizing plate including a polarizer, and a protective layer formed on at least one surface of the polarizer, in which the protective layer is a cured product of a radical curable composition having a hydroxy value of 500 mg KOH/g or more.

Meanwhile, the radical curable composition preferably includes a radical polymerizable first compound including at least two hydroxy groups in a molecule thereof.

In this case, the radical polymerizable compound may be one or more selected from the group consisting of compounds represented by [Formula 1] to [Formula 17].

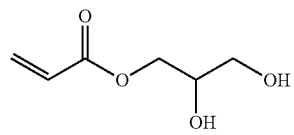

[Formula 1]

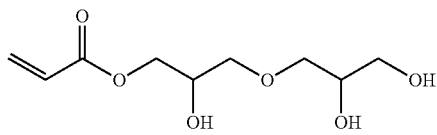

[Formula 2]

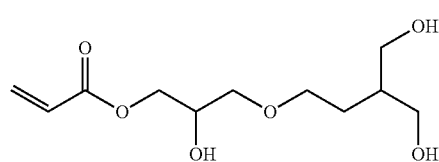

[Formula 3]

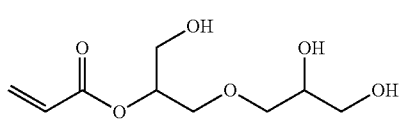

[Formula 4]

-continued
[Formula 5]
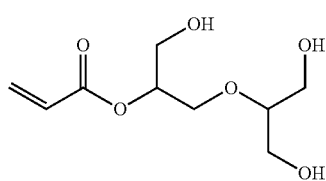
[Formula 6]
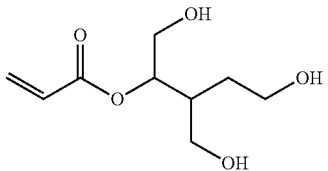
[Formula 7]
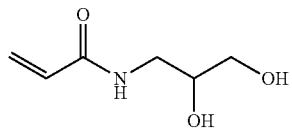
[Formula 8]
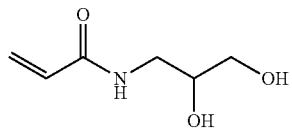
[Formula 9]
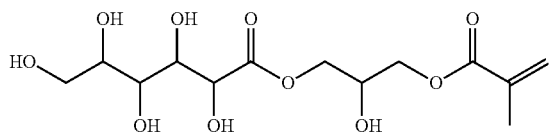
[Formula 10]
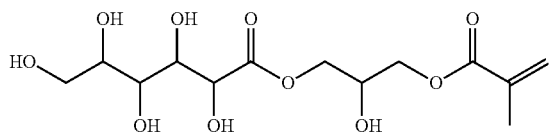
[Formula 11]
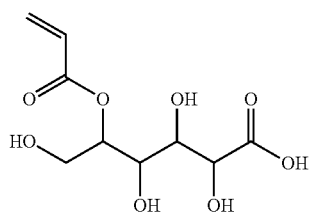
[Formula 12]
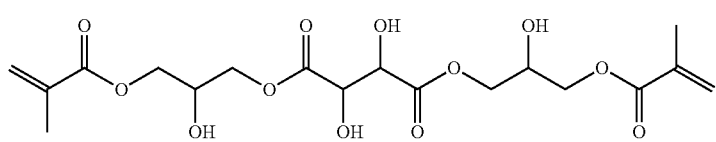
[Formula 13]
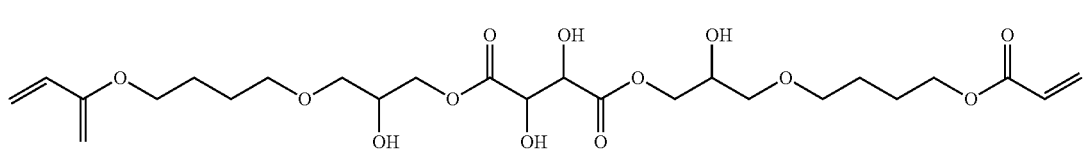
[Formula 14]
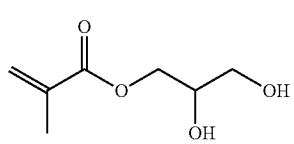
[Formula 15]
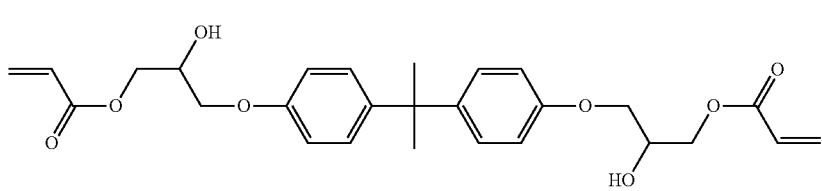
[Formula 16]
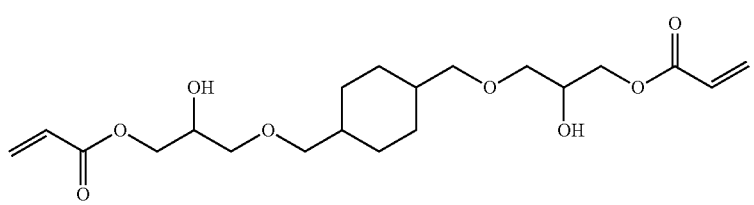

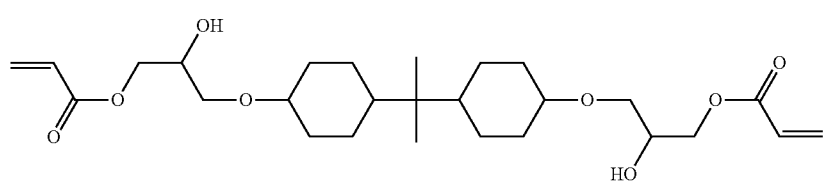
[Formula 17]

Meanwhile, the radical curable composition may be a composition including: (A) a radical polymerizable first compound including at least two hydroxy groups in a molecule thereof, (B) a radical polymerizable second compound including at least one hydrophilic functional group in a molecule thereof, and (C) a radical initiator.

In this case, the radical curable composition preferably includes: (A) 5 to 90 parts by weight of the radical polymerizable first compound including at least two hydroxy groups in a molecule thereof; (B) 5 to 90 parts by weight of the radical polymerizable second compound including at least one hydrophilic functional group in a molecule thereof; and (C) 0.5 to 20 parts by weight of the radical initiator.

Meanwhile, the hydrophilic functional group of the second compound is preferably a hydroxy group.

Specifically, the second compound may be a compound represented by the following [Formula I].

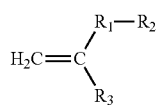
[Formula I]

in [Formula I], $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group.

More specifically, the radical polymerizable second compound may be one or more selected from the group consisting of compounds represented by [Formula 18] to [Formula 23].

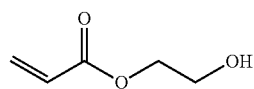
[Formula 18]

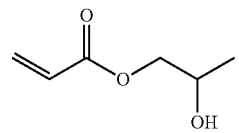
[Formula 19]

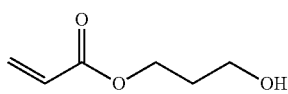
[Formula 20]

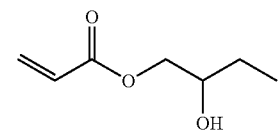
[Formula 21]

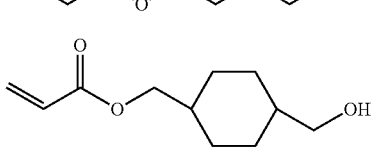
[Formula 22]

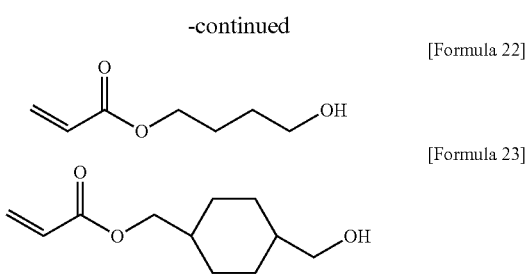
[Formula 23]

Meanwhile, the radical curable composition may a composition further including: (D) a multifunctional (meth)acrylic compound, and/or (E) a phosphate compound including at least one (meth)acrylic group in a molecule thereof.

In this case, the radical curable composition may be a composition including: (A) 5 to 90 parts by weight of the radical polymerizable first compound including at least two hydroxy groups in a molecule thereof; (B) 5 to 90 parts by weight of the radical polymerizable second compound including at least one hydrophilic functional group in a molecule thereof; (C) 0.5 to 20 parts by weight of the radical initiator; (D) 4 to 50 parts by weight of the multifunctional (meth)acrylic compound; and (E) 0.5 to 30 parts by weight of the phosphate compound including at least one (meth)acrylic group in a molecule thereof, based on 100 parts by weight of the radical curable composition.

Also, the radical curable composition may be a composition further including: (F) an epoxy compound having at least one epoxy group in a molecule thereof, and (G) a cationic initiator.

In this case, the radical curable composition may be a composition including: (A) 5 to 90 parts by weight of the radical polymerizable first compound including at least two hydroxy groups in a molecule thereof; (B) 5 to 90 parts by weight of the radical polymerizable second compound including at least one hydrophilic functional group in a molecule thereof; (C) 0.5 to 20 parts by weight of the radical initiator; (F) 1 to 30 parts by weight of the epoxy compound including at least one epoxy group in a molecule thereof; and (G) 0.5 to 15 parts by weight of the cationic initiator, based on 100 parts by weight of the radical curable composition.

Meanwhile, the radical curable composition may be cured by photocuring or thermal curing.

Meanwhile, the radical curable composition after the curing preferably has a glass transition temperature of 50° C. or more.

Meanwhile, the protective layer preferably has a thickness of 0.5 to 20 μm.

Meanwhile, in the polarizing plate of the present invention, a protective film may be further attached, through an adhesive layer, to a surface opposite to a surface of the polarizer on which a protective layer is formed previously.

In addition, the polarizing plate of the present invention may further include an adhesion layer at the upper portion of the protective layer.

In another aspect, the present invention provides an image display device including the polarizing plate.

Advantageous Effects

The polarizing plate of the present invention is excellent in adhesion between a polarizer and a protective layer, and may stably maintain the adhesion even under a high humidity condition.

In addition, the polarizing plate of the present invention may have a high glass transition temperature through a hydrogen bond generated by a high hydroxy value inside the cured protective layer, and thus is thermally stable.

Further, the polarizing plate of the present invention has a protective layer having a small thickness as compared to a polarizing plate having a transparent protective film in the related art, and thus may be manufactured in a thin-type.

MODE FOR INVENTION

Hereinafter, preferred exemplary embodiments of the present invention will be described. However, the exemplary embodiments of the present invention may be modified in various forms, and the scope of the present invention is not limited to the exemplary embodiments which will be described below. Further, exemplary embodiments of the present invention are provided to more completely explain the present invention to a person with ordinary skill in the art.

1. Polarizing Plate

As a result of repeated studies, the present inventors have found that when a radical curable composition for forming a protective layer has a hydroxy group value of 500 mg KOH/g or more, adhesion between a polarizer and a protective layer is excellent, and heat resistance is secured, thereby completing the present invention.

More specifically, the radical curable composition of the present invention is characterized to be a polarizing plate including: a polarizer; and a protective layer formed on at least one surface of the polarizer, in which the protective layer is a cured product of a radical curable composition having a hydroxy value of 500 mg KOH/g or more.

1-1. Polarizer

First, as the polarizer of the present invention, it is possible to use a polarizer well known in the art, for example, a film composed of polyvinyl alcohol (PVA) including iodine or a dichroic dye. The polarizer may be manufactured by dyeing iodine or a dichromatic dye to the PVA film, but the manufacturing method thereof is not particularly limited. In the present specification, the polarizer refers to a state in which the polarizer does not include a protective layer (or a protective film), and the polarizing plate refers to a state in which the polarizing plate includes a polarizer and a protective layer (or a protective film).

Meanwhile, when the polarizer is a polyvinyl alcohol-based film, the polyvinyl alcohol-based film may be used without particular limitation as long as the film includes a polyvinyl alcohol resin or a derivative thereof. In this case, examples of the derivative of the polyvinyl alcohol resin include, but are not limited to, a polyvinyl formal resin, a polyvinyl acetal resin and the like. Also, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., and M3000 and M6000 manufactured by Nippon Synthetic Chemical Industry Co., Ltd., and the like.

Meanwhile, the degree of polymerization of the polyvinyl alcohol-based film may be in a range of 1,000 to 10,000, preferably, in a range of 1,500 to 5,000, but is not limited thereto. This is because when the degree of polymerization satisfies the range, molecules of the polyvinyl alcohol-based film freely move, and may be flexibly mixed with iodine or a dichroic dye, and the like.

1-2. Protective Layer

Next, the protective layer of the present invention is formed by using a radical curable composition to support and protect a polarizer, and the radical curable composition according to the present invention has a hydroxy value of 500 mg·KOH/g or more, for example, preferably 500 to 900 mg·KOH/g, and more preferably 500 to 850 mg·KOH/g. When the hydroxy value of the radical curable composition is high as described above, there is an advantage in that a protective layer formed by using the composition may stably maintain high adhesion with a polarizer even under a relatively high humidity condition, and there is also an advantage in that the bonding strength inside an adhesive cured due to the high hydroxy value as described above is so strong that the protective layer has a high glass transition temperature, and accordingly, thermal stability may be secured.

Meanwhile, the hydroxy value refers to the number of mg of potassium hydroxide (KOH) required to neutralize acetic acid bonded to a hydroxy group when 1 g of a sample is acetylated, and the measurement method is not particularly limited. For example, the hydroxy value in a sample may be calculated through the following Equation (1).

$$\text{(molecular weight of KOH} \times \text{number of —OH in a sample} \times 1{,}000)/\text{molecular weight of the sample} \quad \text{Equation (1):}$$

Meanwhile, the protective layer may be formed by a method well known in the art. For example, the protective layer may be formed by a method of applying the radical curable composition on at least one surface of a polarizer to form a protective layer, and then curing the protective layer. In this case, the application may be performed by application methods well known in the art, for example, methods such as spin coating, bar coating, roll coating, gravure coating and blade coating.

Meanwhile, the curing may be performed by photocuring, more specifically, irradiating an active energy ray such as UV-ray, visible light and electron beam X-ray. For example, the curing may be performed by a method of irradiating UV-ray at about 10 to 2,500 mJ/cm² using a UV-ray irradiation device (metal halide lamp).

Also, the curing may also be performed by thermal curing, more specifically, thermal curing at a curing temperature of 80° C. or more. In this case, a publicly known amine-based initiator may be further added to the composition, if necessary in order to increase the curing rate during the thermal curing.

Also, the curing may also be a curing in which a thermal curing after the photocuring is additionally performed, and a curing in which a photocuring after the thermal curing is additionally performed.

A. First Compound

Meanwhile, the radical curable composition of the present invention preferably includes a radical polymerizable first compound including at least two hydroxy groups in a molecule thereof. In this case, the radical polymerizable first compound may be used without particular limitation as long as the compound may have at least two hydroxy groups in a molecule thereof to implement excellent adhesive strength through a hydrogen bond with a polarizer and increase the hydroxy value of the radical curable composition, and may also have at least one radical polymerizable group in a molecule thereof, for example, an unsaturated double bond between carbon atoms to achieve the radical polymerization.

Meanwhile, the radical polymerizable first compound preferably includes a (meth)acryloyl group as the radical polymerizable group. This is because it is possible to achieve radical polymerization more successfully. Here, the (meth)acryloyl group refers to a radical polymerizable group represented by the following [Formula A].

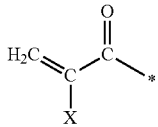
[Formula A]

In [Formula A], X is hydrogen or methyl, and is linked to the other atom in the radical polymerizable first compound, for example, carbon, oxygen, sulfur, nitrogen and the like at the position *.

More specifically, in the present invention, the radical polymerizable first compound may be, but is not limited to, one or more selected from the group consisting of compounds represented by the following [Formula 1] to [Formula 17].

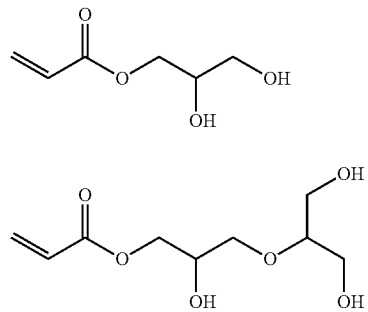

[Formula 1]

[Formula 2]

[Formula 3]

[Formula 4]

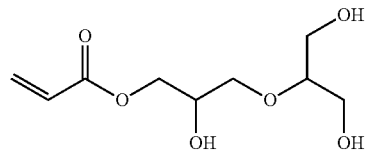

[Formula 5]

[Formula 6]

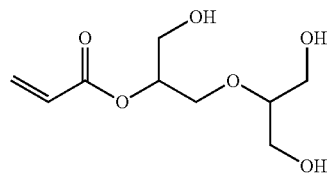

[Formula 7]

[Formula 8]

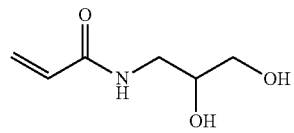

[Formula 9]

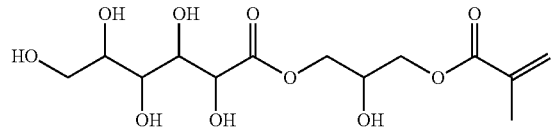

[Formula 10]

[Formula 11]

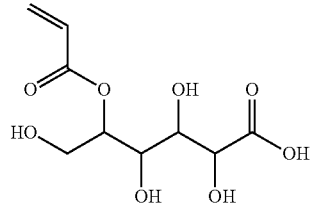

[Formula 12]

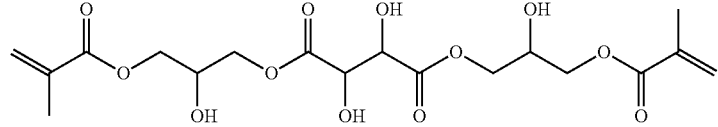

[Formula 13]

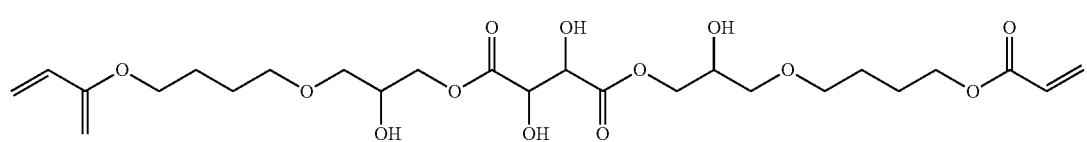

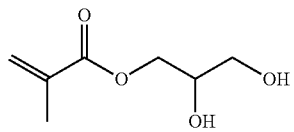

[Formula 14]

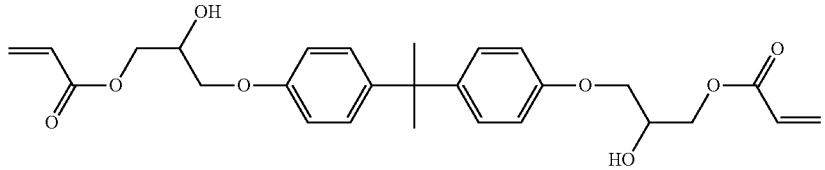

[Formula 15]

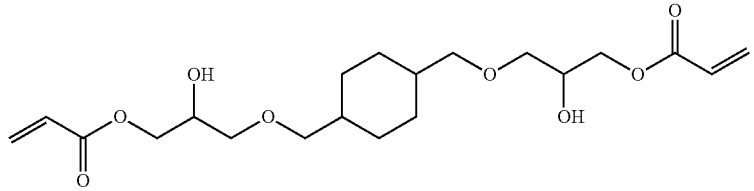

[Formula 16]

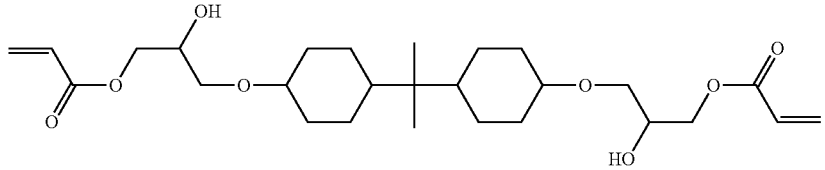

[Formula 17]

Meanwhile, the radical polymerizable first compound of the present invention preferably includes a radical initiator to be described below during the UV curing. However, the radical polymerizable first compound of the present invention may be thermally cured, and in this case, since a radical curable composition including the same may be cured by thermal curing, there is an advantage in that a separate photoradical initiator is not required, and a thermally more stable protective layer may be formed.

B. Second Compound, Radical Initiator

Meanwhile, the radical curable composition of the present invention may further include a radical polymerizable second compound including at least one hydrophilic functional group in a molecule thereof and a radical initiator in order to further enhance adhesion between a polarizer and a protective layer, and promote the radical polymerization to further enhance the curing rate. That is, the radical curable composition of the present invention may also be a composition including: (A) a radical polymerizable first compound including at least two hydroxy groups in a molecule thereof, (B) a radical polymerizable second compound including at least one hydrophilic functional group in a molecule thereof, and (C) a radical initiator.

In this case, (B) the radical polymerizable second compound including at least one hydrophilic functional group in a molecule thereof may be used without particular limitation as long as the compound may have at least one hydrophilic functional group in a molecule thereof to implement adhesion through a hydrogen bonding to the polarizer, and may achieve radical polymerization due to the presence of an unsaturated double bond between carbon atoms in a molecule thereof. However, in the present specification, the radical polymerizable second compound including at least one hydrophilic functional group in a molecule thereof refers to a compound except for the radical polymerizable first compound including at least two hydroxy groups in a molecule thereof.

Meanwhile, the hydrophilic functional group is preferably a hydroxy group for implementing excellent adhesion and obtaining a high hydroxy value. For example, in the present invention, (B) the second polymerizable second compound including at least one hydrophilic functional group in a molecule thereof is preferably, but not limited to, a compound represented by the following [Formula 1].

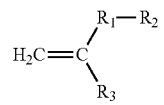

[Formula I]

In [Formula I], $R_1$ is an ester group or an ether group; $R_2$ is a $C_{1 \sim 10}$ alkyl group, a $C_{4 \sim 10}$ cycloalkyl group, or a combination thereof, and in this case, $R_2$ has at least one hydroxy substituent in a molecule thereof; and $R_3$ is hydrogen, or a substituted or unsubstituted $C_{1 \sim 10}$ alkyl group.

In this case, in $R_2$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

In addition, in $R_2$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclohexane ring and the like.

Meanwhile, the hydroxy group may be substituted at any position in an alkyl group or a cycloalkyl group. For example, the hydroxy group may be present at a terminal of an alkyl group, or at the middle of an alkyl group. Meanwhile, the other hydrogen atoms included in the alkyl group or the cycloalkyl group may be substituted with any substituent.

Further, in $R_3$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like. One or more hydrogen atoms included in the alkyl group may be substituted with any substituent.

More specifically, the compound represented by [Formula I] may be, but is not limited to, one or more compounds selected from the group consisting of, for example, compounds represented by the following [Formula 18] to [Formula 23].

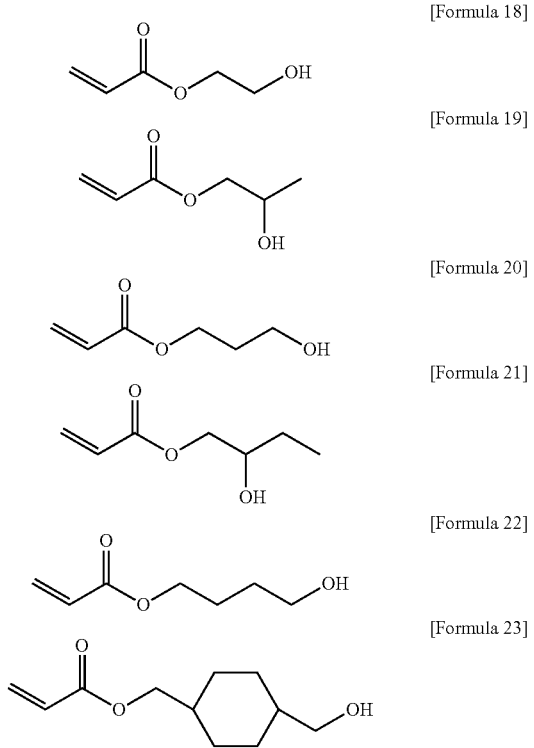

[Formula 18]

[Formula 19]

[Formula 20]

[Formula 21]

[Formula 22]

[Formula 23]

In addition, (C) the radical initiator is for promoting the radical polymerizability to enhance the curing rate, and as the radical initiator, radical initiators generally used in the art may be used without limitation.

More specifically, the radical initiator may be, for example, one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, and phenylbis(2,4,6-trimethylbenzoyl)-phosphineoxide. Particularly in the present invention, phenylbis(2,4,6-trimethylbenzoyl)-phosphineoxide may be preferably used.

Meanwhile, the radical curable composition of the present invention more preferably includes: (A) 5 to 90 parts by weight of the radical polymerizable first compound including at least two hydroxy groups in a molecule thereof; (B) 5 to 90 parts by weight of the radical polymerizable second compound including at least one hydrophilic functional group in a molecule thereof; and (C) 0.5 to 20 parts by weight of the radical initiator.

More specifically, (A) the radical polymerizable first compound including at least two hydroxy groups in a molecule thereof may be present in an amount of 10 to 90 parts by weight, preferably 10 to 80 parts by weight, and more preferably 20 to 80 parts by weight, based on 100 parts by weight of the entire radical curable composition. When (A) the compound satisfies the content, both excellent adhesion and water resistance may be secured.

Furthermore, (B) the radical polymerizable second compound including at least one hydroxy group in a molecule thereof may be present in an amount of 5 to 90 parts by weight, preferably 5 to 80 parts by weight, and more preferably 10 to 80 parts by weight, based on 100 parts by weight of the entire radical curable composition. When (B) the compound satisfies the content, excellent adhesion may be obtained.

Further, (C) the radical initiator may be present in an amount of 0.5 to 20 parts by weight, preferably 0.5 to 15 parts by weight, and more preferably 0.5 to 10 parts by weight, based on 100 parts by weight of the entire radical curable composition. This is because when the content of the radical initiator satisfies the numerical range, the radical curable composition may be smoothly cured.

C. Additional Composition 1 for Improving Water Resistance

Meanwhile, the radical curable composition of the present invention may include (D) a multifunctional (meth)acrylic compound and/or (E) a phosphate-based compound including at least one (meth)acrylic group in a molecule thereof, in order to increase the degree of crosslinking in the protective layer to improve water resistance, thereby exhibiting stable physical properties even under a high humidity environment.

For example, the radical curable composition of the present invention may be a composition including: (A) a radical polymerizable first compound including at least two hydroxy groups in a molecule thereof; (C) a radical initiator; (D) a multifunctional (meth)acrylic compound and/or (E) a phosphate compound including at least one (meth)acrylic group in a molecule thereof.

Also, the radical curable composition of the present invention may be a composition including: (A) a radical polymerizable first compound including at least two hydroxy groups in a molecule thereof; (B) a radical polymerizable second compound comprising at least one hydrophilic functional group in a molecule thereof; (C) a radical initiator; (D) a multifunctional (meth)acrylic compound and/or (E) a phosphate compound including at least one (meth)acrylic group in a molecule thereof.

In this case, as (D) the multifunctional (meth)acrylic compound, various multifunctional (meth)acrylic compounds well known in the art may be used without particular limitation. However, in the present specification, except for the following multifunctional (meth)acrylic compounds enumerated as an example, a compound corresponding to the above-described (A) and (B) compounds and (E) a compound to be described below will be excluded from the multifunctional (meth)acrylic compounds.

In the present invention, examples of (D) the multifunctional (meth)acrylic compound include ethylene glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, trimethylol propane di(meth)acrylate, pentaerythritol di(meth)acrylate, ditrimethylol propane di(meth)acrylate, diethylene glycol di(meth)acrylate, triethylene glycol di(meth)acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicone di(meth)acrylate, hydroxypivalic acid ester neopentyl glycol di(meth)acrylate, 2,2-bis[4-(meth)acryloyloxyethoxyethoxyphenyl]propane, 2,2-bis[4-(meth)acryloyloxyethoxyethoxycyclohexyl]propane, hydrogenated dicyclopentadienyl di(meth)acrylate, tricyclodecane dimethaneol di(meth)acrylate, 1,3-dioxane-2,5-diyl di(meth)acrylate, di(meth)acrylate of 2-(2-hydroxy-1,1-dimethylethyl)-5-ethyl-5-hydroxymethyl-1,3-dioxane, tris(hydroxyethyl)isocyanurate di(meth)acrylate, glycerin tri(meth)acrylate, trimethylolpropane tri(meth)acrylate, ditrimethyolpropanetri(meth)acrylate, di trimethylol propane tetra(meth)acrylate, pentaerythritol tri(meth)acrylate, pentaerythritol tetra(meth)acrylate, di pentaerythritol tetra(meth)acrylate, dipentaerythritol penta (meth)acrylate, dipentaerythritol hexa(meth)acrylate and the like. These compounds may be used either alone or in a mixture.

Meanwhile, (D) the multifunctional (meth)acrylic compound is more preferably one or more selected from the group consisting of compounds represented by the following [Formula II] to [Formula IV], but is not limited thereto. This is because water resistance improvement effects are further excellent in this case.

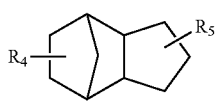

[Formula II]

In [Formula II], $R_4$ and $R_5$ are each independently a (meth)acryloyloxy group or a (meth)acryloyloxy alkyl group.

In this case, in $R_4$ and $R_5$, the alkyl of the (meth)acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. One or more hydrogen atoms included in the alkyl may be substituted with any substituent.

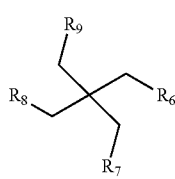

[Formula III]

In [Formula III], $R_6$, $R_7$ and $R_8$ are each independently a (meth)acryloyloxy group, or a (meth)acryloyloxy alkyl group, and $R_9$ is a (meth)acryloyloxy group, a (meth)acryloyloxy alkyl group, a hydroxy group, or a substituted or unsubstituted $C_{1\sim10}$ alkyl group.

In this case, in $R_6$, $R_7$, $R_8$ and $R_9$, the alkyl of the (meth)acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. One or more hydrogen atoms included in the alkyl may be substituted with any substituent.

Further, in $R_9$, the alkyl group refers to a straight-chained or branch-chained hydrocarbon moiety having 1 to 10, or 1 to 8, or 1 to 4 carbon atoms, and one or more hydrogen atoms included in the alkyl group may be substituted with any substituent.

[Formula IV]

In [Formula IV], $R_{10}$ is a substituted or unsubstituted $C_{1\sim10}$ alkylene, and $R_{11}$ and $R_{12}$ are each independently a (meth)acryloyloxy group or a (meth)acryloyloxy alkyl group.

In this case, in $R_{10}$, the alkylene refers to a straight-chained or branch-chained divalent hydrocarbon moiety having 1 to 10, or 1 to 8, or 1 to 6 carbon atoms, and the alkylene group in the present specification may also include at least one unsaturated bond in a molecule thereof. Meanwhile, examples of the alkylene group include, but are not limited to, methylene, ethylene, trimethylene, tetramethylene, pentamethylene, hexamethylene, heptamethylene, nonamethylene, decamethylene and the like. One or more hydrogen atoms included in the alkylene may be substituted with any substituent.

Furthermore, in $R_{11}$ and $R_{12}$, the alkyl of the (meth)acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. One or more hydrogen atoms included in the alkyl may be substituted with any substituent.

More specifically, (D) the multifunctional (meth)acrylic compound may be, but is not limited to, one or more compounds selected from the group consisting of compounds represented by the following [Formula 24] to [Formula 27].

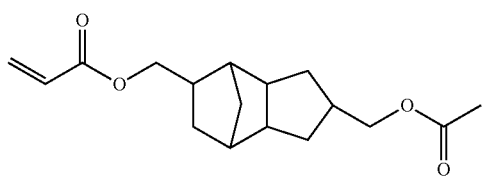

[Formula 24]

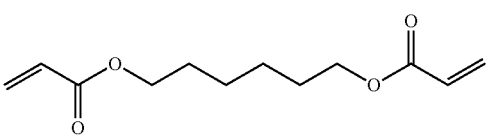

[Formula 25]

-continued

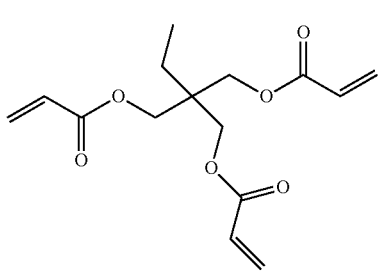

[Formula 26]

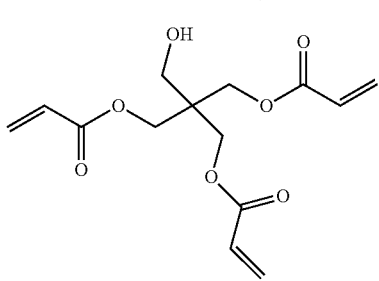

[Formula 27]

Further, the phosphate compound including at least one (meth)acrylic group in a molecule thereof may be used without particular limitation as long as the compound is a phosphate compound including at least one (meth)acrylic group in a molecule thereof. For example, (E) the phosphate compound including at least one (meth)acrylic group in a molecule thereof may be, but is not limited to, a compound represented by the following [Formula V].

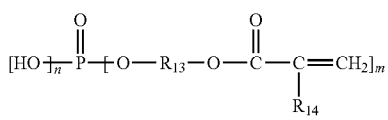

[Formula V]

In [Formula VI], $R_{13}$ is a substituted or unsubstituted $C_{1~10}$ alkylene group, a substituted or unsubstituted $C_{4~14}$ cycloalkylene group, a substituted or unsubstituted $C_{6~14}$ arylene group, or a combination thereof; $R_{14}$ is hydrogen or a methyl group; and n is an integer of 0 to 2, m is an integer of 1 to 3, and n+m=3.

In this case, in $R_{13}$, the alkylene group refers to a straight-chained or branch-chained divalent hydrocarbon moiety having 1 to 10, or 1 to 8, or 1 to 4 carbon atoms, and the alkylene group in the present specification may also include at least one unsaturated bond in a molecule thereof. Meanwhile, examples of the alkylene group include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_{13}$, the cycloalkylene group refers to a non-aromatic divalent monocyclic, bicyclic or tricyclic hydrocarbon moiety of 4 to 14, or 4 to 10, or 4 to 6 ring carbons, and the alkylene group in the present specification may also include at least one unsaturated bond in a molecule thereof. Meanwhile, examples of the cycloalkylene group include, but are not limited to, a divalent cyclopentane ring, a divalent cyclohexane ring and the like. One or more hydrogen atoms included in the cycloalkylene group may be substituted with any substituent.

Furthermore, in $R_{13}$, the arylene group refers to a divalent monocyclic, bicyclic or tricyclic aromatic hydrocarbon moiety having 6 to 14, or 6 to 12 ring carbons, and examples thereof include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, $R_{13}$ is not limited thereto, but among them, is preferably a substituted or unsubstituted $C_{1~10}$ alkylene group, more preferably a substituted or unsubstituted $C_{1~8}$ alkylene group, and even more preferably a substituted or unsubstituted $C_{1~4}$ alkylene group.

Further, it is preferred that in n and m, n is an integer of 1 and 2, m is an integer of 1 and 2, and n+m=3, and it is particularly preferred that n is 2, m is 1, and n+m=3.

More specifically, (E) the phosphate compound including at least one (meth)acrylic group in a molecule thereof may be, but is not limited to, one or more compounds selected from the group consisting of compounds represented by the following [Formula 28] to [Formula 33].

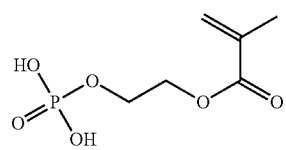

[Formula 28]

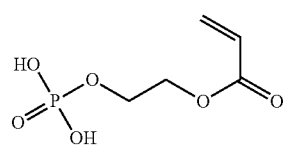

[Formula 29]

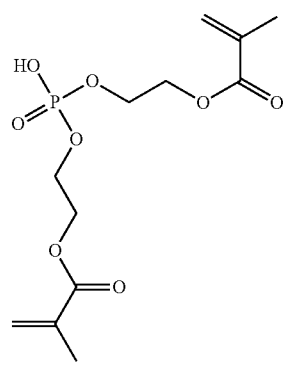

[Formula 30]

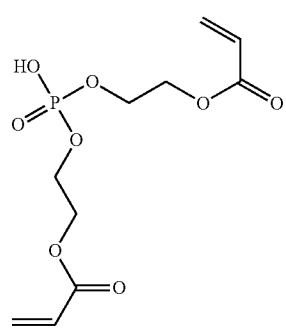

[Formula 31]

-continued

[Formula 32]

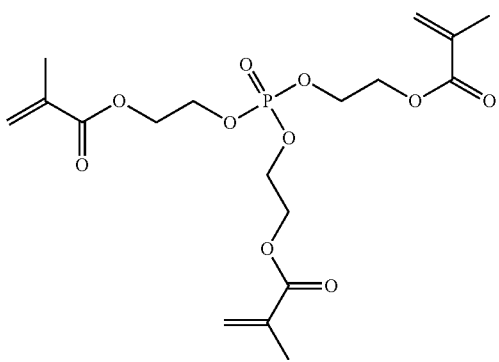

[Formula 33]

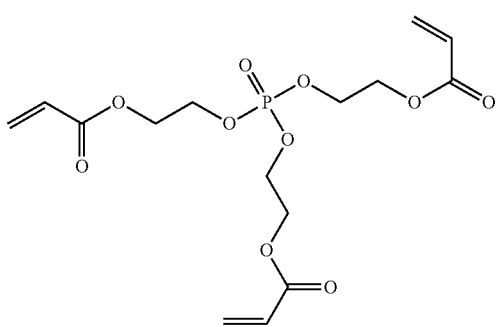

Meanwhile, when the radical curable composition of the present invention further includes (D) the compound and/or (E) the compound as described above, the content of (A) the radical polymerizable first compound including at least two hydroxy groups in a molecule thereof may be 10 to 90 parts by weight, preferably 10 to 80 parts by weight, and more preferably 20 to 80 parts by weight, based on 100 parts by weight of the entire radical curable composition. When (A) the compound satisfies the content, both excellent adhesion and a high glass transition temperature may be secured.

Furthermore, the content of (B) the radical polymerizable second compound including at least one hydrophilic functional group in a molecule thereof may be 5 to 90 parts by weight, preferably 5 to 80 parts by weight, and more preferably 10 to 80 parts by weight, based on 100 parts by weight of the entire radical curable composition. When (B) the compound satisfies the content, excellent adhesion may be obtained.

Further, the content of (C) the radical initiator may be 0.5 to 20 parts by weight, preferably 0.5 to 15 parts by weight, and more preferably 0.5 to 10 parts by weight, based on 100 parts by weight of the entire radical curable composition. This is because when the content of the radical initiator satisfies the numerical range, the adhesive may be smoothly cured.

In addition, the content of (D) the multifunctional (meth)acrylic compound may be 4 to 50 parts by weight, preferably 5 to 40 parts by weight, and more preferably 6 to 40 parts by weight, based on 100 parts by weight of the entire radical curable composition. When (D) the compound satisfies the content range, the radical curable composition of the present invention may secure excellent adhesion and water resistance.

Furthermore, the content of (E) the phosphate compound including at least one (meth)acryloyloxy group in a molecule thereof may be 0.5 to 30 parts by weight, preferably 0.5 to 20 parts by weight, and more preferably 0.5 to 15 parts by weight, based on 100 parts by weight of the entire radical curable composition. When (E) the compound satisfies the content range, the radical curable composition of the present invention may secure excellent adhesion and water resistance.

For example, the radical curable composition may be a composition including: (A) 5 to 90 parts by weight of the radical polymerizable first compound including at least two hydroxy groups in a molecule thereof; (B) 5 to 90 parts by weight of the radical polymerizable second compound including at least one hydrophilic functional group in a molecule thereof; (C) 0.5 to 20 parts by weight of the radical initiator; (D) 4 to 50 parts by weight of the multifunctional (meth)acrylic compound; and/or (E) 0.5 to 30 parts by weight of the phosphate compound including at least one (meth)acrylic group in a molecule thereof, based on 100 parts by weight of the radical curable composition.

D. Additional Composition 2 for Improving Water Resistance

Meanwhile, the radical curable composition of the present invention may additionally include an epoxy compound, which additionally includes (F) an epoxy compound including at least one epoxy group in a molecule thereof, and (G) a cationic initiator, in order to improve water resistance to exhibit stable physical properties even under a high humidity environment.

For example, the radical curable composition of the present invention may be a composition including: (A) a radical polymerizable first compound including at least two hydroxy groups in a molecule thereof; (F) an epoxy compound including at least one epoxy group in a molecule thereof; and (G) a cationic initiator.

Also, the radical curable composition of the present invention may be a composition including: (A) a radical polymerizable first compound including at least two hydroxy groups in a molecule thereof; (B) a radical polymerizable second compound including at least one hydrophilic functional group in a molecule thereof; (C) a radical initiator; (F) an epoxy compound including at least one epoxy group in a molecule thereof; and (G) a cationic initiator.

In this case, (F) the epoxy compound including at least one epoxy group in a molecule thereof is not particularly limited as long as the compound includes at least one epoxy group in a molecule thereof, and examples thereof include an aromatic epoxy-based compound, a hydrogenated epoxy-based compound, an alicyclic epoxy-based compound, an epoxy group-containing (meth)acrylic compound and the like. These compounds may be used either alone or in a mixture of two or more thereof.

In this case, the aromatic epoxy-based compound refers to an epoxy-based compound including at least one aromatic hydrocarbon ring in a molecule thereof, and examples thereof include, but are not limited to, a bisphenol-type epoxy resin such as diglycidyl ether of bisphenol A, diglycidyl ether of bisphenol F, and diglycidyl ether of bisphenol S; a novolac-type epoxy resin such as a phenol novolac epoxy resin, a cresol novolac epoxy resin, and a hydroxybenzaldehyde phenol novolac epoxy resin; a multifunctional epoxy resin such as a glycidyl ether of tetrahydroxy phenylmethane, a glycidyl ether of tetrahydroxy benzophenone, and epoxidized polyvinylphenol, and the like.

Further, the hydrogenated epoxy-based compound refers to an epoxy-based compound obtained by selectively subjecting the aromatic epoxy-based compound to a hydrogenation reaction under pressure in the presence of a catalyst.

In addition, the alicyclic epoxy-based compound refers to an epoxy-based compound in which an epoxy group is formed between two adjacent carbon atoms which constitute an aliphatic hydrocarbon ring, and examples thereof include, but are not limited to, 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinylcyclohexane dioxide, bis(3,4-epoxycyclohexylmethyl)adipate, bis(3,4-epoxy-6-methylcyclohexylmethyl)adipate, exo-exo bis(2,3-epoxycyclopentyl)ether, endo-exo bis(2,3-epoxycyclopentyl)ether, 2,2-bis[4-(2,3-epoxypropoxy)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentyl phenyl-2,3-epoxypropyl ether, 1-(2,3-epoxypropoxy)phenyl-5,6-epoxyhexahydro-4,7-methanoindane, o-(2,3-epoxy) cyclopentyl phenyl-2,3-epoxypropyl ether), 1,2-bis[5-(1,2-epoxy)-4,7-hexahydro methanoindanoxyl]ethane cyclopentyl phenyl glycidyl ether, methylenebis(3,4-epoxycyclohexane)ethylene glycol di(3,4-epoxycyclohexylmethyl)ether, ethylenebis(3,4-epoxycyclohexanecarboxylate) and the like.

In addition, the epoxy group-containing (meth)acrylic compound refers to a compound including both an epoxy group and a (meth)acryloyloxy group in a molecule thereof, and examples thereof include, but are not limited to, glycidyl acrylate, 2-methyl glycidyl acrylate, 3,4-epoxy butyl acrylate, 6,7-epoxy heptyl acrylate, 3,4-epoxycyclohexyl acrylate, glycidyl methacrylate, 2-methylglycidyl methacrylate, 3,4-epoxy butyl methacrylate, 6,7-epoxy heptyl methacrylate, 3,4-epoxycyclohexyl methacrylate, 4-hydroxybutyl acrylate glycidyl ether and the like.

Meanwhile, (F) the epoxy compound including at least one epoxy group in a molecule thereof preferably includes one or more selected from the group consisting of an alicyclic epoxy-based compound and an epoxy group-containing (meth)acrylic compound. In this case, the alicyclic epoxy-based compound is particularly preferably an epoxy-based compound having at least two epoxy groups and at least two alicyclic rings in a molecule thereof among them, for example, 3,4-epoxycyclohexylmethyl-3,4-epoxycyclohexane carboxylate and the like, and the epoxy group-containing (meth)acrylic compound is particularly preferably a glycidyl (meth)acrylic compound, for example, glycidyl acrylate, glycidyl methacrylate and the like among them. In this case, an effect of improving water resistance of the protective layer of the present invention is very excellent.

Further, (G) the cationic initiator is a compound which generates acid (H$^+$) by an active energy ray, and a cationic initiator which may be used in the present invention is preferably an initiator which includes, for example, a sulfonium salt or an iodonium salt. Specific examples of the photoacid generator including the sulfonium salt or the iodonium salt include, for example, one or more selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium) dihexafluoroantimonate, and (thiodi-4,1-phenylene)bis(diphenylsulfonium) dihexafluorophosphate, but are not limited thereto.

Meanwhile, when the radical curable composition of the present invention further includes (F) the compound and (G) the cationic initiator as described above, the content of (A) the radical polymerizable first compound including at least two hydroxy groups in a molecule thereof may be 10 to 90 parts by weight, preferably 10 to 80 parts by weight, and more preferably 20 to 80 parts by weight, based on 100 parts by weight of the entire radical curable composition. When (A) the compound satisfies the content, both excellent adhesion and a high glass transition temperature may be secured.

Furthermore, the content of (B) the radical polymerizable second compound including at least one hydrophilic functional group in a molecule thereof may be 5 to 90 parts by weight, preferably 5 to 80 parts by weight, and more preferably 10 to 80 parts by weight, based on 100 parts by weight of the entire radical curable composition. When (B) the compound satisfies the content, the radical curable composition of the present invention may have particularly excellent adhesion.

Further, the content of (C) the radical initiator may be 0.5 to 20 parts by weight, preferably 0.5 to 15 parts by weight, and more preferably 0.5 to 10 parts by weight, based on 100 parts by weight of the entire radical curable composition. When the content of the radical initiator satisfies the numerical range, the adhesive may be smoothly cured.

In addition, the content of (F) the epoxy compound including at least one epoxy group in a molecule thereof may be 1 to 30 parts by weight, preferably 4 to 25 parts by weight, and more preferably 5 to 20 parts by weight, based on 100 parts by weight of the entire radical curable composition. When (F) the compound satisfies the content range, the radical curable composition of the present invention may secure excellent adhesion and water resistance.

Furthermore, the content of (G) the cationic initiator may be 0.5 to 15 parts by weight, preferably 0.5 to 12 parts by weight, and more preferably 0.5 to 10 parts by weight, based on 100 parts by weight of the entire radical curable composition. When the cationic initiator satisfies the content range, the adhesive may be smoothly cured.

For example, the radical curable composition may be a composition including: (A) 5 to 90 parts by weight of the radical polymerizable first compound including at least two hydroxy groups in a molecule thereof; (B) 5 to 90 parts by weight of the radical polymerizable second compound including at least one hydrophilic functional group in a molecule thereof; (C) 0.5 to 20 parts by weight of the radical initiator; (F) 1 to 30 parts by weight of the epoxy compound including at least one epoxy group in a molecule thereof; and (G) 0.5 to 15 parts by weight of the cationic initiator, based on 100 parts by weight of the radical curable composition.

E. Physical Properties of Radical Curable Composition

Meanwhile, the radical curable composition is a compound having a glass transition temperature of 50° C. or more after the curing. For example, the glass transition temperature may be 55 to 200° C. or 60 to 200° C. This is because a protective layer to be formed is very thermally stable, and a polarizing plate including the same is excellent in heat resistance.

Further, the thickness of a protective film formed by using the radical curable composition is preferably 0.5 to 20 μm, and may be, for example, 0.5 to 15 μm or 0.5 to 10 μm. This is because a polarizing plate manufactured may become thin and light weight when the thickness of the protective layer satisfies the range. When the thickness is too small, thermal impact stability and curl characteristics of the polarizer are vulnerable, and when the thickness is too large, it is difficult to make the polarizing plate thin and light weight.

1-3. Protective Film

Meanwhile, the polarizing plate of the present invention may further include a protective film on one surface of the polarizer, if necessary. More specifically, when the protective layer is formed on one surface of the polarizer in the polarizing plate of the present invention, a separate protective film may be attached to a surface opposite to the surface, on which a protective layer is formed, through an adhesive layer in order to support and protect the polarizer.

In this case, the protective film is provided for supporting and protecting a polarizer, and it is possible to use protective films formed of various materials generally known in the art, for example, a cellulose-based film, a polyethylene terephthalate (PET) film, a cycloolefin polymer (COP) film, an acrylic film and the like without limitation. Among them, it is particularly preferred that an acrylic film is used in consideration of optical properties, durability, economic efficiency and the like.

Meanwhile, the acrylic film which may be used in the present invention may be obtained by molding a molding material including a (meth)acrylate-based resin as a main component by extrusion molding. In this case, the (meth)acrylate-based resin includes a resin including a (meth)acrylate-based unit as a main component, and is a concept which includes not only a homopolymer resin composed of a (meth)acrylate-based unit but also a copolymer resin in which other monomer units other than the (meth)acrylate-based unit are copolymerized, and a blend resin in which other resins are blended with the aforementioned (meth)acrylate-based resin.

Meanwhile, the (meth)acrylate-based unit may be, for example, an alkyl(meth)acrylate-based unit. Here, the alkyl (meth)acrylate-based unit refers to both an alkyl acrylate-based unit and an alkyl methacrylate-based unit, and the alkyl group of the alkyl(meth)acrylate-based unit has preferably 1 to 10 carbon atoms, and more preferably 1 to 4 carbon atoms.

Further, examples of a monomer unit capable of being copolymerized with the (meth)acrylate-based unit include a styrene-based unit, a maleic anhydride-based unit, a maleimide-based unit and the like. In this case, examples of the styrene-based unit include, but are not limited to, styrene, a-methylstyrene and the like; examples of the maleic anhydride-based monomer include, but are not limited to, maleic anhydride, methyl maleic anhydride, cyclohexyl maleic anhydride, phenyl maleic anhydride, and the like; and examples of the maleimide-based monomer include, but are not limited to, maleimide, N-methyl maleimide, N-cyclohexyl maleimide, N-phenyl maleimide and the like. These may be used either alone or in a mixture.

Meanwhile, the acrylic film may be a film including a (meth)acrylate-based resin having a lactone ring structure. Specific examples of the (meth)acrylate-based resin having a lactone ring structure include (meth)acrylate-based resins having a lactone ring structure, which are described in, for example, the official gazettes of Japanese Patent Application Laid-Open Nos. 2000-230016, 2001-151814, and 2002-120326, and the like.

The method of manufacturing the acrylic film is not particularly limited, and for example, the acrylic film may be manufactured by sufficiently mixing a (meth)acrylate-based resin, other polymers, an additive and the like by any appropriate mixing method to manufacture a thermoplastic resin composition, and then film-molding the resin composition, or may also be manufactured by preparing the (meth) acrylate-based resin, other polymers, an additive and the like in separate solutions, mixing the solutions to form a homogeneous mixture solution, and then film-molding the mixture solution. In addition, the acrylic film may be an unstretched film, or a stretched film. The stretched film may be a uniaxially stretched film or a biaxially stretched film, and the biaxially stretched film may be a simultaneous biaxially stretched film or a sequential biaxially stretched film.

Meanwhile, the polarizing plate of the present invention may further include a primer layer between the adhesive layer and the protective film in order to further enhance adhesive strength. In this case, the primer layer may be formed by a method of applying a coating solution including a water-dispersible polymer resin, a water-dispersible particulate and water on a protective film by using a bar coating method, a gravure coating method and the like, and drying the coating solution. The water-dispersible polymer resin may be, for example, a water-dispersible polyurethane-based resin, a water-dispersible acrylic resin, a water-dispersible polyester-based resin or a combination thereof, and the like, and for the water-dispersible particulate, it is possible to use an inorganic-based particulate such as silica, titania, alumina and zirconia, or an organic-based particulate composed of a silicone-based resin, a fluorine-based resin, a (meth)acrylic resin, a crosslinked polyvinyl alcohol and a melamine-based resin, or a combination thereof, but the particulate is not limited thereto.

Meanwhile, the polarizer and the protective film may be attached by a method of coating an adhesive on the surface of the polarizer or the protective film by using a roll coater, a gravure coater, a bar coater, a knife coater, or a capillary coater, and the like, and then heating and paper-laminating the polarizer or the protective film by a laminated paper roll, or laminating paper by compressing the polarizer or the protective film at normal temperature, a method of irradiating UV after the paper-lamination, or the like. Meanwhile, as the adhesive, various adhesives for a polarizing plate used in the art, for example, a polyvinyl alcohol-based adhesive, a polyurethane-based adhesive, an acrylic adhesive, a cationic or radical adhesive and the like may be used without limitation.

1-4. Adhesion Layer

Meanwhile, the polarizing plate of the present invention may include an adhesion layer at the upper portion of the protective layer, if necessary, for attachment to an optical film such as a display device panel or a phase difference film.

In this case, the adhesion layer may be formed by using various adhesives well known in the art, and the kind thereof is not particularly limited. For example, the adhesion layer may be formed by using a rubber-based adhesive, an acrylic adhesive, a silicone-based adhesive, a urethane-based adhesive, a polyvinyl alcohol-based adhesive, a polyvinyl pyrrolidone-based adhesive, a polyacryl amide-based adhesive, a cellulose-based adhesive, a vinyl alkyl ether-based adhesive and the like. Among them, it is particularly preferred that an acrylic film is used in consideration of transparency, heat resistance and the like.

Meanwhile, the adhesion layer may be formed by a method of applying a adhesive at the upper portion of the protective layer, and may also be formed by a method of attaching an adhesion sheet, which is manufactured by applying a adhesive on a release sheet, and then drying the adhesive, at the upper portion of the protective layer.

2. Image Display Device

The aforementioned polarizing plate of the present invention may be usefully applied to an image display device such as a liquid crystal display device. The image display device may be, for example, a liquid crystal display device including a liquid crystal panel and polarizing plates each provided on both surfaces of the liquid crystal panel, and in this case, at least one of the polarizing plates may be the polarizing plate according to the present invention. In this case, the kind of the liquid crystal panel included in the liquid crystal display device is not particularly limited. For example, it is possible to apply all the publicly known panels such as a passive matrix type panel such as a twisted nematic (TN)-type, a super twisted nematic (STN)-type, a ferroelectric (F)-type, or a polymer dispersed (PD)-type; an active matrix type panel such as a two terminal or three terminal; an in plane switching (IPS) panel and a vertical alignment (VA) panel without being limited to the kind thereof. Furthermore, the kinds of other configurations which constitute the liquid crystal display device, for example, the kinds of upper and lower substrates (e.g., a color filter substrate, or an array substrate) and the like are not particularly limited, and the configuration publicly known in the field may be adopted without limitation.

Hereinafter, the present invention will be described in more detail with reference to specific Examples.

Preparation Example 1—Manufacture of Acrylic Protective Film

A raw material pellet was manufactured by supplying a resin composition, in which poly(N-cyclohexylmaleimide-co-methylmethacrylate), a styrene-maleic anhydride copolymer resin and a phenoxy-based resin were uniformly mixed with each other at a weight ratio of 100:2.5:5, to a 24Φ extruder in which a portion from a raw material hopper to the extruder was substituted with nitrogen, and melting the mixed resin composition at 250° C.

PKFE (Mw=60,000, Mn=16,000, Tg=95° C.) manufactured by InChemRez® Co., Ltd., was used as the phenoxy-based resin, Dylaeck 332 with a content of 85 wt % of styrene and 15 wt % of anhydrous maleic anhydride was used as the styrene-maleic anhydride copolymer resin, and as the poly(N-cyclohexylmaleimide-co-methylmethacrylate) resin, a resin with a content of 6.5 wt % of N-cyclohexylmaleimide as a result of NMR analysis was used.

The obtained raw material pellet was dried under vacuum, melted by the extruder at 260° C., allowed to pass through a coat hanger-type T-die, and allowed to pass through a chrome plating casting roll and a drying roll and the like to manufacture a film having a thickness of 150 μm. A pilot stretching device was used to stretch the film at a ratio of 170% in the MD direction at 125° C. by using the difference between speeds of the rolls, thereby manufacturing an acrylic film.

After the acrylic film manufactured by the aforementioned process was subjected to corona treatment, a primer composition, in which 20 parts by weight of an oxazoline crosslinking agent (Nippon Shokubai Co., Ltd., WS700) was added to a primer composition with a solid content of 10 wt % that is prepared by diluting CK-PUD-F (Chokwang urethane dispersion) with pure water, was coated on one surface of the acrylic film with a #7 bar, and then the acrylic film was stretched at a ratio of 190% in a TD direction at 130° C. using a tenter, thereby finally manufacturing an acrylic protective film having a primer layer thickness of 400 nm.

Preparation Example 2—Preparation of Radical Curable Composition (1) Radical Curable Composition A Radical curable composition A for a polarizing plate was prepared by adding 3 parts by weight of a radical initiator Irgacure-819 (manufactured by Ciba Specialty Chemicals Co., Ltd.) to 100 parts by weight of a resin composition prepared by putting 100 wt % of glyceryl monoacrylate (GLA).

(2) Radical Curable Composition B

Radical curable composition B for a polarizing plate was prepared by adding 3 parts by weight of a radical initiator Irgacure-819 (manufactured by Ciba Specialty Chemicals Co., Ltd.) to 100 parts by weight of a resin composition prepared by putting 80 wt % of glyceryl monoacrylate (GLA) and 20 wt % of hydroxyethyl acrylate (HEA).

(3) Radical Curable Composition C

Radical curable composition C for a polarizing plate was prepared by adding 3 parts by weight of a radical initiator Irgacure-819 (manufactured by Ciba Specialty Chemicals Co., Ltd.) to 100 parts by weight of a resin composition prepared by putting 80 wt % of glyceryl mono-methacrylate (GLM) and 20 wt % of hydroxyethyl acrylate (HEA).

(4) Radical Curable Composition D

Radical curable composition D for a polarizing plate was prepared by adding 3 parts by weight of a radical initiator Irgacure-819 (manufactured by Ciba Specialty Chemicals Co., Ltd.) to 100 parts by weight of a resin composition prepared by putting 80 wt % of glyceryl monoacrylate (GLA) and 20 wt % of 1,4-cyclohexanedimethanol monoacrylate.

(5) Radical Curable Composition E

Radical curable composition E for a polarizing plate was prepared by adding 3 parts by weight of a radical initiator Irgacure-819 (manufactured by Ciba Specialty Chemicals Co., Ltd.) to 100 parts by weight of a resin composition prepared by putting 100 wt % of hydroxyethyl acrylate (HEA).

(6) Radical Curable Composition F

Radical curable composition F for a polarizing plate was prepared by adding 3 parts by weight of a radical initiator Irgacure-819 (manufactured by Ciba Specialty Chemicals Co., Ltd.) to 100 parts by weight of a resin composition prepared by putting 100 wt % of hydroxyethyl acrylamide (HEAR).

Example 1

Radical curable composition A was applied on a primer layer of an acrylic film-based protective film prepared in Preparation Example 1 by using a dropper, and lamination was performed on one surface of a polarizer (PVA device), a condition was set such that the thickness of the final adhesive layer became 1 to 2 μm, and the film was allowed to pass through a laminator (5 m/min). Then, a polarizing plate including a protective film on one surface of a polarizer was manufactured by irradiating UV light with 1,000 mJ/cm² on a surface, on which the acrylic film was laminated, using a UV irradiation device (metal halide lamp).

Next, Radical curable composition A was applied on the other surface of the side on which the protective film of the polarizer of the polarizing plate manufactured above was laminated, a PET film having a release force was laminated, a condition was set such that the thickness of the final protective layer became 4 to 5 μm, and then the film was allowed to pass through a laminator (5 m/min). Then, a polarizing plate including a protective film on one surface of a polarizer and a protective layer on the other surface thereof was manufactured by irradiating UV light with 1,000 mJ/cm² on a surface, on which a release PET film was laminated, using a UV irradiation device (metal halide lamp), and removing the PET film.

Example 2

A polarizing plate was manufactured in the same manner as in Example 1, except that Radical curable composition B was used.

Example 3

A polarizing plate was manufactured in the same manner as in Example 1, except that Radical curable composition B was used, and then the polarizing plate was subjected to heat treatment in an oven at 90° C. for 1 minute.

Example 4

A polarizing plate was manufactured in the same manner as in Example 1, except that Radical curable composition C was used.

Example 5

A polarizing plate was manufactured in the same manner as in Example 1, except that Radical curable composition D was used.

Comparative Example 1

A polarizing plate was manufactured in the same manner as in Example 1, except that Radical curable composition E was used.

Comparative Example 2

A polarizing plate was manufactured in the same manner as in Example 1, except that Radical curable composition F was used.

Experimental Example 1—Hydroxy Value

The hydroxy values of the composition used in Examples 1 to 5 and Comparative Examples 1 and 2 were measured, and are shown in the following [Table 1]. In this case, the hydroxy value of the composition was calculated by using the following Equation (1).

(molecular weight of KOH×number of —OH in a sample×1,000)/molecular weight of the sample    Equation (1):

Experimental Example 2—Evaluation of Adhesion of Protective Layer

The adhesion of the protective layers of the polarizing plates manufactured in Examples 1 to 5 and Comparative Examples 1 and 2 was measured, and is shown in the following [Table 1]. Specifically, the radical curable compositions used in Examples 1 to 5 and Comparative Examples 1 and 2 were applied at a thickness of 4 to 5 μm on a polarizer (PVA device), a polarizer (PVA device) was laminated thereon and allowed to pass through a laminator, and then a UV irradiation device (metal halide lamp) was used to irradiate UV rays thereon at 1,000 mJ/cm², thereby preparing a peel strength sample composed of a polarizer/a protective layer/a polarizer. The prepared sample was left to stand under conditions of a temperature of 20° C. and a humidity of 70% for 4 days, and then cut into a width of 20 mm and a length of 100 mm, and a texture analyzer device (TA-XT Plus manufactured by Stable Micro Systems Ltd.) was used to measure a peel strength at a speed of 300 m/min and an angle of 90 degrees. In this case, the sample was evaluated as excellent, good and bad when the peel strength thereof is 1.0 N/2 cm to 2.0 N/2 cm, 0.5 N/2 cm or more and less than 1.0 N/2 cm, and less than 0.5 N/2 cm, respectively.

Experimental Example 3—Evaluation of Thermal Impact Property

The adhesion of the protective layers of the polarizing plates manufactured in Examples 1 to 5 and Comparative Examples 1 and 2 was measured, and is shown in the following [Table 1]. Specifically, the evaluation was performed by repeating a process of laminating the polarizing plates manufactured in Examples 1 to 5 and Comparative Examples 1 and 2 on a glass substrate, leaving the laminates to stand at −40° C. for 30 minutes, and then leaving the laminates to stand again at 80° C. for 30 minutes 100 times. Then, it was visually evaluated whether the external appearance of the polarizing plate changed. The cases, in which cracks with a size of 2 mm or less were generated only at the end portions, cracks with a short line shape of 5 mm or more were only confirmed at the portions other than the end portions, and a plurality of cracks was generated on the entire surface of the polarizing plate in the external appearance of the polarizing plate, were indicated as excellent, good, and bad, respectively.

TABLE 1

| Classification | Composition | Hydroxy value [mg KOH/g] | Thickness of protective layer [μm] | Adhesion | Thermal impact stability |
|---|---|---|---|---|---|
| Example 1 | A | 768 | 5 | Good | Good |
| Example 2 | B | 711 | 5 | Excellent | Excellent |
| Example 3 | B | 711 | 5 | Excellent | Excellent |
| Example 4 | C | 657 | 5 | Excellent | Good |
| Example 5 | D | 671 | 5 | Good | Excellent |
| Comparative Example 1 | E | 483 | 5 | Good | Bad |
| Comparative Example 2 | F | 487 | 5 | Bad | Good |

As seen in Table 1, it can be known that in the case of Examples 1 to 5 of the present invention in which the hydroxy value of 500 mg·KOH/g or more, adhesion of the protective layer is excellent even under a humid environment, and thermal impact stability is also excellent.

However, it can be known that in the case of Comparative Examples 1 and 2 in which the hydroxy value is less than 500 mg·KOH/g, thermal impact stability is not good in Comparative Example 1 and adhesion of the protective layer is not good in Comparative Example 2.

Next, the following experiments were performed in order to confirm an effect of improving water resistance when the radical curable composition of the present invention further includes (D) the compound and (E) the compound, or (F) the compound, and (G) the cationic initiator of the present invention.

Preparation Example 3—Preparation of Radical Curable Composition (1) Radical Curable Composition G Radical curable composition G for a polarizing plate was prepared by adding 3 parts by weight of a radical initiator Irgacure-819 (manufactured by Ciba Specialty Chemicals Co., Ltd.) to 100 parts by weight of a resin composition prepared by putting 64.5 wt % of glyceryl monoacrylate (GLA), 16 wt % of hydroxyethyl acrylate (HEA), 16 wt % of dimethylol tricyclodecane diacrylate (DCPDA) and 3.5 wt % of di-(methacryloyloxy ethyl)phosphate.

(2) Radical Curable Composition H

Radical curable composition H for a polarizing plate was prepared by adding 3 parts by weight of a cationic initiator CPI 100P (manufactured by Sanapro Inc.) and 3 parts by weight of a radical initiator Irgacure-819 (manufactured by Ciba Specialty Chemicals Co., Ltd.) to 100 parts by weight of a resin composition prepared by putting 73 wt % of glyceryl monoacrylate (GLA), 18 wt % of hydroxyethyl acrylate (HEA) and 9 wt % of glycidyl methacrylate (GMA).

Example 6

A polarizing plate was manufactured in the same manner as in Example 1, except that Radical curable composition G was used.

Example 7

A polarizing plate was manufactured in the same manner as in Example 1, except that Radical curable composition H was used.

Experimental Example 4—Evaluation of Water Resistance of Polarizing Plate

Water resistance of the polarizing plates manufactured in Examples 6 and 7 was measured, and is shown in the following [Table 2]. Specifically, the polarizing plates in Examples 6 and 7 were laminated on a glass substrate, and then immersed in a thermostat at 60° C., and the water resistance was judged by observing whether the end portions of the polarizing plate had been discolored after 8 hours, and the cases in which no change was observed and discoloration occurred were indicated as excellent and bad, respectively. Meanwhile, the methods of measuring the hydroxy value, adhesion and glass transition temperature additionally described in the following Table 2 are the same as those described above.

TABLE 2

| Classification | Composition | Water resistance | Hydroxy value [mg KOH/g] | Adhesion | Thermal impact stability |
|---|---|---|---|---|---|
| Example 6 | E | Excellent | 576 | Excellent | Excellent |
| Example 7 | F | Excellent | 630 | Excellent | Good |

As seen in Table 2, it can be confirmed that in Examples 6 and 7 in which the radical curable composition of the present invention further includes (D) the compound and (E) the compound, or (F) the compound and (G) the cationic initiator of the present invention, water resistance is also excellent.

Meanwhile, in the case of the Examples, the adhesive layer and the protective layer were manufactured by using the same radical curable composition for convenience when the polarizing plate was manufactured, but the present invention is not limited thereto.

As described above, exemplary embodiments of the present invention have been described in detail, but it will be obvious to a person with ordinary skill in the art that the scope of the present invention is not limited thereto, and various modifications and changes may be made without departing from the technical spirit of the present invention described in the claims.

The invention claimed is:

1. A polarizing plate comprising:
   a polarizer; and
   a protective layer formed on at least one surface of the polarizer,
   wherein the protective layer is a cured product of a radical curable composition which has a hydroxy value of 500 mg·KOH/g or more.

2. The polarizing plate of claim 1, wherein the radical curable composition comprises a radical polymerizable first compound comprising at least two hydroxy groups in a molecule thereof.

3. The polarizing plate of claim 2, wherein the radical polymerizable first compound is one or more selected from the group consisting of compounds represented by the following [Formula 1] to [Formula 17]

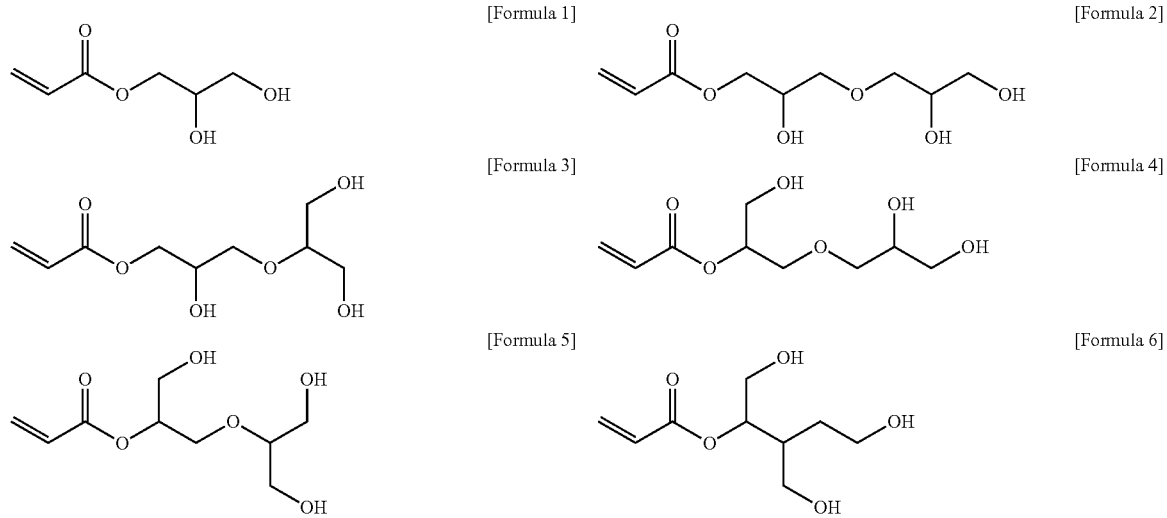

-continued

[Formula 7]
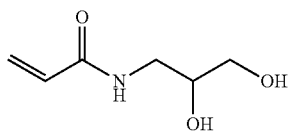

[Formula 8]
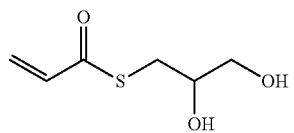

[Formula 9]
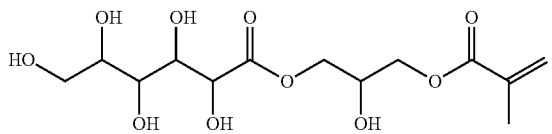

[Formula 10]
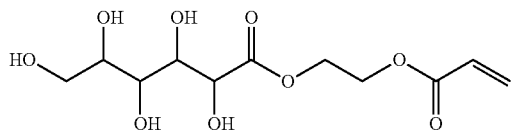

[Formula 11]
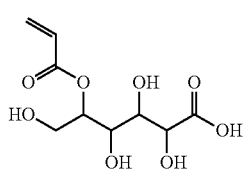

[Formula 12]
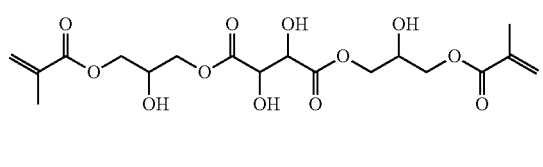

[Formula 13]
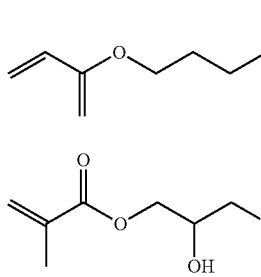

[Formula 14]
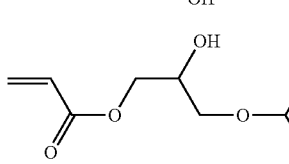

[Formula 15]
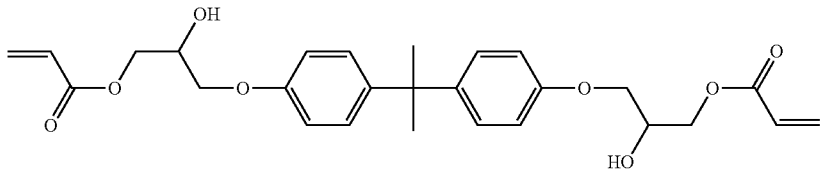

[Formula 16]
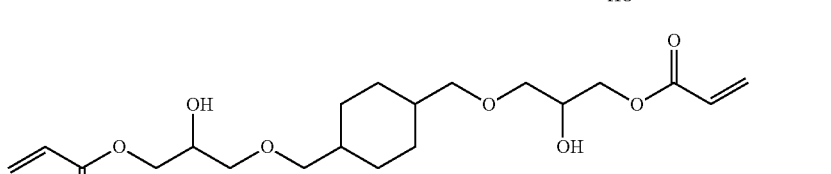

[Formula 17]
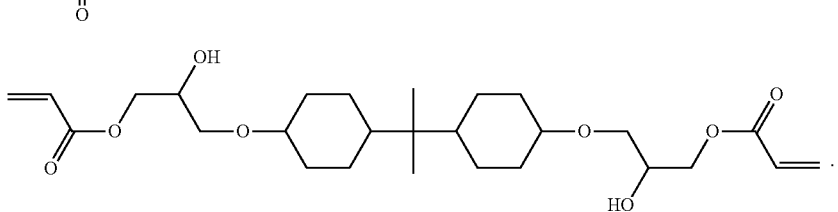

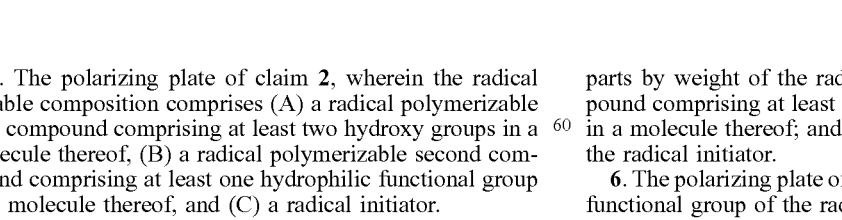

4. The polarizing plate of claim 2, wherein the radical curable composition comprises (A) a radical polymerizable first compound comprising at least two hydroxy groups in a molecule thereof, (B) a radical polymerizable second compound comprising at least one hydrophilic functional group in a molecule thereof, and (C) a radical initiator.

5. The polarizing plate of claim 4, wherein the radical curable composition comprises: (A) 5 to 90 parts by weight of the radical polymerizable first compound comprising at least two hydroxy groups in a molecule thereof; (B) 5 to 90 parts by weight of the radical polymerizable second compound comprising at least one hydrophilic functional group in a molecule thereof; and (C) 0.5 to 20 parts by weight of the radical initiator.

6. The polarizing plate of claim 4, wherein the hydrophilic functional group of the radical polymerizable second compound is a hydroxy group.

7. The polarizing plate of claim 4, wherein the radical polymerizable second compound is represented by the following [Formula I]

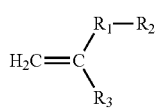
[Formula I]

in [Formula I], $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group.

8. The polarizing plate of claim 4, wherein the radical polymerizable second compound is one or more selected from the group consisting of compounds represented by the following [Formula 18] to [Formula 23]

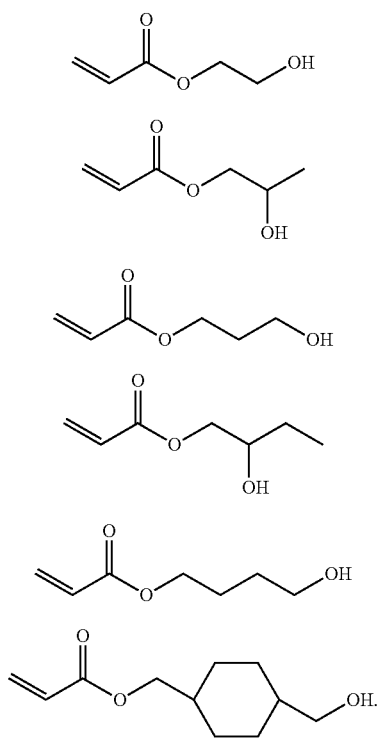

[Formula 18]
[Formula 19]
[Formula 20]
[Formula 21]
[Formula 22]
[Formula 23]

9. The polarizing plate of claim 2, wherein the radical curable composition further comprises (D) a multifunctional (meth)acrylic compound, (E) a phosphate compound comprising at least one (meth)acrylic group in a molecule thereof, or a combination thereof.

10. The polarizing plate of claim 9, wherein (D) the multifunctional (meth)acrylic compound is included in an amount of 4 to 50 parts by weight based on 100 parts by weight of the radical curable composition.

11. The polarizing plate of claim 9, wherein (E) the phosphate compound comprising at least one (meth)acrylic group in a molecule thereof is included in an amount of 0.5 to 30 parts by weight based on 100 parts by weight of the radical curable composition.

12. The polarizing plate of claim 2, wherein the radical curable composition further comprises (F) an epoxy compound including at least one epoxy group in a molecule thereof, and (G) a cationic initiator.

13. The polarizing plate of claim 12, wherein (F) the epoxy compound comprising at least one epoxy group in a molecule thereof is included in an amount of 1 to 30 parts by weight based on 100 parts by weight of the radical curable composition.

14. The polarizing plate of claim 12, wherein (G) the cationic initiator is included in an amount of 0.5 to 15 parts by weight based on 100 parts by weight of the radical curable composition.

15. The polarizing plate of claim 1, wherein the radical curable composition is cured by photocuring or thermal curing.

16. The polarizing plate of claim 1, wherein the radical curable composition after the curing has a glass transition temperature of 50° C. or more.

17. The polarizing plate of claim 1, wherein a thickness of the protective film is 0.5 to 20 μm.

18. The polarizing plate of claim 1, wherein a protective film is attached to a surface opposite to a surface of the polarizer, on which the protective layer is formed, through an adhesive layer.

19. The polarizing plate of claim 1, further comprising:
an adhesion layer at an upper portion of the protective layer.

20. An image display device comprising the polarizing plate of claim 1.

* * * * *